(12) United States Patent
Chapelain et al.

(10) Patent No.: US 8,839,601 B2
(45) Date of Patent: Sep. 23, 2014

(54) DOOR FOR THRUST REVERSER OF AN AIRCRAFT NACELLE

(71) Applicant: Aircelle, Gonfreville l'Orcher (FR)

(72) Inventors: Loic Chapelain, Thiais (FR); Denis Guillois, Limours (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/941,946

(22) Filed: Jul. 15, 2013

(65) Prior Publication Data

US 2013/0292490 A1 Nov. 7, 2013

Related U.S. Application Data

(63) Continuation of application No. PCT/FR2012/050058, filed on Jan. 10, 2012.

(30) Foreign Application Priority Data

Jan. 14, 2011 (FR) ...................................... 11 50297

(51) Int. Cl.
*F02K 1/70* (2006.01)
*F02K 1/56* (2006.01)
*F02K 1/76* (2006.01)

(52) U.S. Cl.
CPC . *F02K 1/566* (2013.01); *F02K 1/70* (2013.01); F05D 2250/411 (2013.01); F05D 2240/126 (2013.01); Y02T 50/671 (2013.01)
USPC ........... 60/230; 60/226.2; 60/204; 244/110 B; 244/110 D; 239/265.37; 239/265.19

(58) Field of Classification Search
CPC ............... F02K 1/70; F02K 1/72; F02K 1/76; F02K 1/763; F02K 1/09; F02K 1/566; F05D 2240/126; F05D 2250/411; Y02T 50/671
USPC ................... 60/226.2, 204, 230; 239/265.37, 239/265.19, 265.29; 244/110 B, 110 D
See application file for complete search history.

(56) References Cited

U.S. PATENT DOCUMENTS

| | | | | |
|---|---|---|---|---|
| 4,894,985 | A * | 1/1990 | Dubois et al. | 60/226.2 |
| 5,267,438 | A * | 12/1993 | Bunel et al. | 60/226.2 |
| 6,045,091 | A * | 4/2000 | Baudu et al. | 244/110 B |
| 6,293,495 | B1 * | 9/2001 | Aten et al. | 244/110 B |
| 2011/0204161 | A1 * | 8/2011 | D'Inca | 239/265.27 |
| 2013/0056554 | A1 * | 3/2013 | Guillois et al. | 239/265.19 |

FOREIGN PATENT DOCUMENTS

| | | |
|---|---|---|
| EP | 0301939 A1 | 2/1989 |
| FR | 2916484 A1 | 11/2008 |

* cited by examiner

*Primary Examiner* — William H Rodriguez
*Assistant Examiner* — Carlos A Rivera
(74) *Attorney, Agent, or Firm* — Brinks Gilson & Lione

(57) ABSTRACT

A door for a thrust reverser of a nacelle of an aircraft being pivotally amounted on a fixed structure of the nacelle, in particular, the door being fitted with deflectors deflecting air flow is disclosed. The deflectors are arranged at an upstream end of the door and mounted such that they can move in a deflection plane perpendicular to the plane of the door. Each deflector is associated at its ends with an articulation arm capable of rotating about a pivot axis perpendicular to the deflection plane, allowing the deflectors to move in a straight line in the deflection plane. The present disclosure also relates to a thrust reverser system including the door and a fixed structure on which the door is pivotally mounted between a closing position and an open position.

4 Claims, 3 Drawing Sheets

DOOR FOR THRUST REVERSER OF AN AIRCRAFT NACELLE

CROSS-REFERENCE TO RELATED APPLICATIONS

This application is a continuation of International Application No. PCT/FR2012/050058, filed on Jan. 10, 2012, which claims the benefit of FR 11/50297, filed on Jan. 14, 2011. The disclosures of the above applications are incorporated herein by reference.

FIELD

The present disclosure relates to a thrust reverser for a turbojet engine, and a door for such a thrust reverser of an aircraft nacelle.

BACKGROUND

The statements in this section merely provide background information related to the present disclosure and may not constitute prior art.

An aircraft is driven by several turbojet engines each accommodated in a nacelle also harboring a set of ancillary actuation devices related to its operation and ensuring various functions when the turbojet engine is operating or at a standstill. These ancillary actuation devices notably comprise a mechanical system for actuating a thrust reverser.

A nacelle generally has a tubular structure along a longitudinal axis comprising an air intake upstream from the turbojet engine, a middle section intended to surround a fan of the turbojet engine, a downstream section harboring thrust reversal means and intended to surround the combustion chamber of the turbojet engine. The tubular structure generally ends with an ejection nozzle, the outlet of which is located downstream from the turbojet engine.

Modern nacelles are intended to harbor a dual flux turbojet engine capable of generating via rotating blades of the fan a hot air flow (also called a "primary flow") stemming from the combustion chamber of a turbojet engine, and a cold air flow ("secondary flow") which circulates outside the turbojet engine through a ring-shaped passage also called an "annular vein".

By the term of "downstream" is meant the direction corresponding to the direction of the cold air flow penetrating the turbojet engine. The term of "upstream" designates the opposite direction.

The annular vein is formed in the downstream section by an external structure called an outer fixed structure (OFS) and an internal concentric structure called an inner fixed structure (IFS) surrounding the structure of the engine strictly speaking downstream from the fan. The internal and external structures belong to the downstream section. The external structure may include one or several rotationally mobile doors so as to be capable, under the action of driving means, of switching between an inactive closed position during the operation of the turbojet engine, a so called "direct thrust" mode, in which the doors form a portion of the downstream section, and a reversal position or open position in which they switch so that a downstream portion of each door will at least partly obturate the conduit of the nacelle and an upstream portion in the downstream section opens a passage allowing the airflow to be radially channeled relatively to a longitudinal axis of the nacelle.

In order to be able to improve the reorientation of the air flow in a direction tending as close as possible towards a longitudinal direction of the nacelle, some doors have been equipped with terminal spoilers, also called baffles, forming upstream from the door a return element substantially perpendicular to the plane formed by the latter. Thus, when the door is in the thrust reversal position, the spoiler is orientated in a direction substantially longitudinal to the nacelle and forces the air flow in this direction.

When the door is in the closed position, each spoiler is orientated along a direction substantially perpendicular to the longitudinal axis of the nacelle and penetrates the air flow circulation vein. There is the risk that the spoiler will then block the air flow circulating in the direct thrust mode, which is not permissible.

In order to overcome this drawback, doors have been designed so as to have an upstream cavity at an internal surface of said door. Consequently, the door has reduced thickness upstream which allows both the spoiler to protrude from said door and not to have a length greater than the thickness of the nacelle upstream from the door in order not to penetrate the annular circulation vein of the air flow when the door is in the closed position.

However, such a cavity forms a significant aerodynamic hindrance inside the annular air flow vein when the door is in the closed position, which reduces the overall performances of the turbojet engine.

Rotationally mobile spoilers along a plane perpendicular to the plane of the door, called a "deflection plane", are known from application FR 2916484.

In spite of the advantages provided by the operation of such spoilers, it may prove to be of interest to increase the front surface area of each spoiler in contact with the deflected air flow in order to improve the orientation of the whole of the deflected air flow.

SUMMARY

According to a first aspect of the present disclosure, a door for a thrust reverser of an aircraft nacelle is capable of being pivotally mounted on a fixed structure of the nacelle comprising an internal surface designed in order to be integrated to an annular circulation vein of an airflow and an external surface designed for ensuring the outer aerodynamic continuity of the nacelle intended to be equipped with said thrust reverser.

The door is equipped with means for deflecting the air flow positioned at an upstream end of the door and moveably mounted in a deflection plane substantially perpendicular to the plane of the door between a first retracted position in which the deflection means do not penetrate the annular vein when the door is in the closed position, and a second deployed position in which the deflection means will protrude from the door when the door is in the open position, each deflection means being associated at its ends with an articulation arm rotationally mobile about a pivot axis substantially perpendicular to the deflection plane allowing rectilinear displacement of said deflection means in the deflection plane upon passing from the retracted position to the deployed position.

Thus, by means of the articulation arm, the deflection means are set into motion according to a substantially rectilinear displacement in the deflection plane. The door of the present disclosure thus has a deflection system which is simple to install, not cumbersome and reliable to use.

Further, the rectilinear displacement of the deflection means allows the totality of the surface area of the deflection means to be able to be in contact with the deflected air flow. Therefore, by means of the door of the present disclosure, the size of the deflection means may be optimized according to the desired size of the surface area in contact with the deflected air flow.

Further, advantageously, the adjustment of the kinematics of the deflection means may be simply achieved by adjusting the kinematics of the articulation arms.

It is also possible to absorb the load of the aerodynamic forces of the deflection means with the articulation arms without resorting to additional devices of the slider or friction shoe type.

Finally, it is possible to contemplate synchronization of the whole of the deflection means when said means attain the deployed position.

According to other features of the present disclosure, the door includes one or several of the following optional features considered alone or according to all possible combinations:

the deflection means each comprise an abutment means positioned at one end of each deflection means so as to block the position of the deflection means in the deployed position with which it is possible to limit the deployment of the deflection means and avoid damaging the neighboring ends of two deflection means;

the articulation arms include at each end at least one elastic return means, notably as a coil spring, giving the possibility of switching from the retracted position to the deployed position, which gives the possibility in a simple and efficient way of ensuring the return to the deployed position when the nacelle receiving the door of the present disclosure is in the thrust reversal position;

the door comprises a door actuator allowing the door to pass from the open position to the closed position, said actuator being positioned so as to receive and block the adjacent ends of two deflection means in the retracted position, which allows saving of space and mass while allowing efficient retention of the deflection means in the retracted position;

the deflection means comprise at least two spoilers or two flaps mounted on either side of a median axis of the door.

According to another aspect, the present disclosure illustrates a thrust reversal system comprising at least one door and a fixed structure on which said door is pivotally mounted between a closed position in which it closes the thrust reverser and forms a portion of an external cowling, the means for deflecting the flow being in a retracted position, and an open position in which it clears a passage in the fixed structure so as to deflect said one air flow, the deflection means being in a deployed position.

In one form, the thrust reverser system according to the present disclosure comprises abutment means attached onto the fixed structure so as to receive and block the adjacent ends of two deflection means in the retracted position which gives the possibility in a simple and not very cumbersome way of blocking the deflection means in the retracted position.

The present disclosure also addresses a nacelle for a turbojet engine comprising at least one thrust reverser system.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which.

Figure 1:
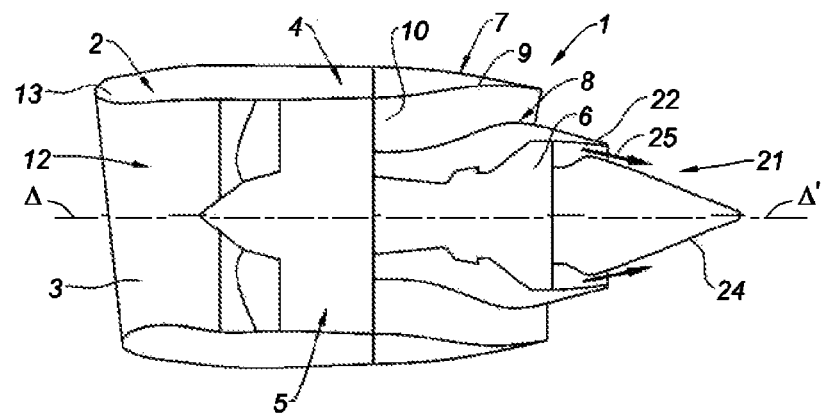
FIG. 1 is a partly schematic sectional view of a form of a nacelle of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As illustrated in FIG. 1, a nacelle 1 according to the present disclosure has a substantially tubular shape along a longitudinal axis $\Delta$. The nacelle of the present disclosure 1 comprises an upstream section 2 with an air intake lip 13 forming an air intake 3, a middle section 4 surrounding a fan 5 of a turbojet engine 6 and a downstream section 7. The downstream section 7 comprises an internal structure 8 (generally called an <<IFS>>) surrounding the upstream portion of the turbojet engine 6, an external structure (OFS) 9 supporting a moveable cowl (not shown) including thrust reversal means.

The IFS 8 and the OFS 9 delimit an annular vein 10 allowing circulation of an air flow 12 penetrating the nacelle 1 of the present disclosure at the air intake 3.

The nacelle 1 of the present disclosure ends with an ejection nozzle 21 comprising an external module 22 and an internal module 24. The internal 24 and external 22 modules define a channel for the stream of a hot air flow 25 emerging from the turbojet engine 6.

Figure 2:
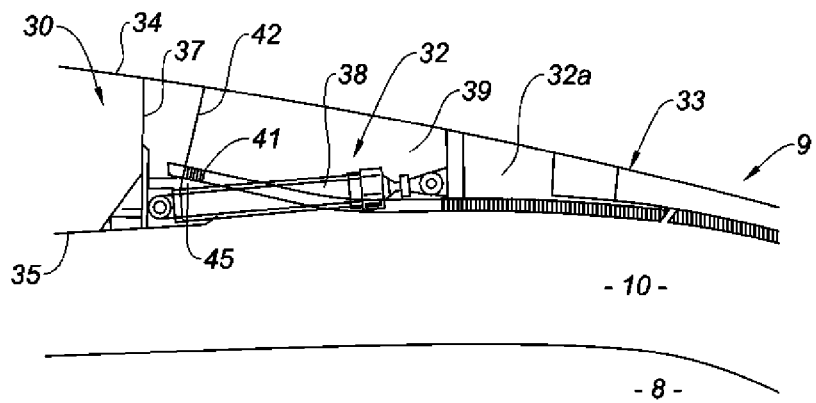
FIGS. 2 and 3 are partial schematic cross-sectional views of a door of a thrust reverser according to the present disclosure in a respectively closed and open position.
Figure 3:
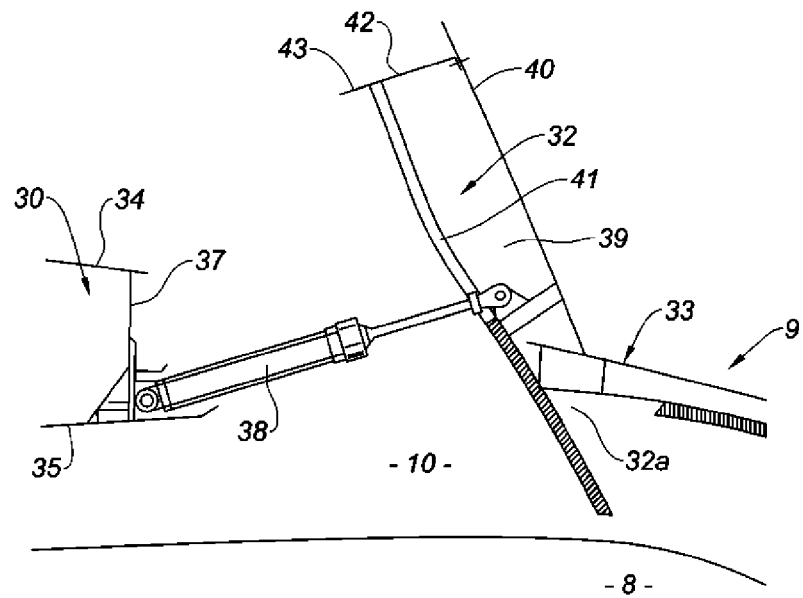

According to the form illustrated in FIGS. 2 and 3, a door thrust reverser includes doors equipped with a deflection means in the form of a spoiler. In an alternative, the deflection means may be in the form of a plurality of flaps. A flap is distinguished from a spoiler by the fact that it has a lower tilted portion relatively to a planar upper portion, said lower portion also having curvature aiming at optimizing the reorientation of the inverted air flow.

The thrust inverter with spoiler doors typically comprises three main portions, i.e. a fixed portion in the form of an upper panel 30 located upstream in the OFS 9, a moveable portion 32 downstream from the upstream panel 30 and a fixed downstream ferrule 33. The fixed portion 30 comprises an external panel 34 ensuring aerodynamic continuity of the external surface of the nacelle 1, and an internal panel 35 forming an external panel of the annular vein 10. The external 34 and internal 35 panels are connected through a front frame 37 which also ensures support of the means for controlling the moveable portion 32, formed in this case by an actuator 38.

The moveable portion 32 typically includes one or several displaceable elements commonly called doors 39. Each door 39 is pivotally mounted about an axis of rotation substantially co-linear with the plane formed by each door 39 and substantially perpendicular to the longitudinal axis Δ of the nacelle of the present disclosure.

Consequently, under the action of the control means 38, each door 39 may switch between a position in which it ensures the structural continuity between the upstream panel 30 and the downstream ferrule 33 and an open position in which said door 39 clears a passage between the upstream panel 30 and the downstream ferrule 33 allowing the air flow to escape through said opening.

As illustrated in FIG. 3, during this pivoting, a downstream portion of the door 32a will at least partly block the annular vein 10 thereby forcing the flow to circulate through the cleared opening.

From a structural point of view, the door 39 comprises an external panel 40 which will, in the direct thrust mode, be placed in the extension of the external panel of the fixed upstream panel 30 and ensure outer aerodynamic continuity with an external panel 45 of the rear portion (see FIG. 2), on the one hand and, an internal panel 41 and an upstream frame 42 connecting the external panel 40 and the internal panel 41 on the other hand.

The upstream frame 42 is extended at the upstream end with deflection means 43 intended, when the door 39 is open, for reorienting a portion of the air flow towards the front of the nacelle thereby generating a counter-thrust.

To do this, the deflection means 43 are in a deflection plane substantially perpendicular to the plane of the door between a first refracted position in which the deflection means 43 do not penetrate the annular vein 10 when the door 39 is in a closed position and a second deployed position in which the deflection means 43 will protrude from the door 39.

The deflection means 43 may comprise at least two deflection means 43a and 43b mounted on either side of a median axis Δm of the door 39.

Figure 4:
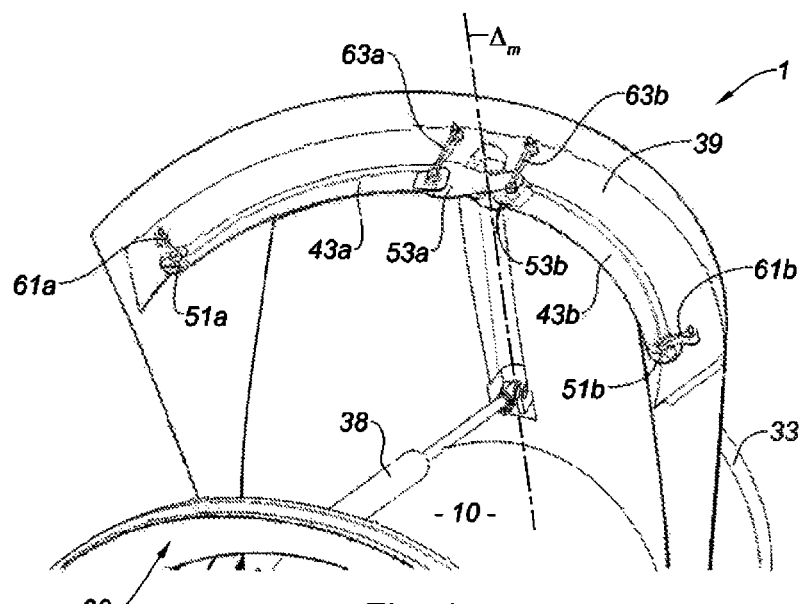
FIG. 4 is a partial and schematic perspective view of a door of the present disclosure in the open position (further called <<thrust reversal>> position) mounted on a nacelle corresponding to the form of FIG. 1.
Figure 5:
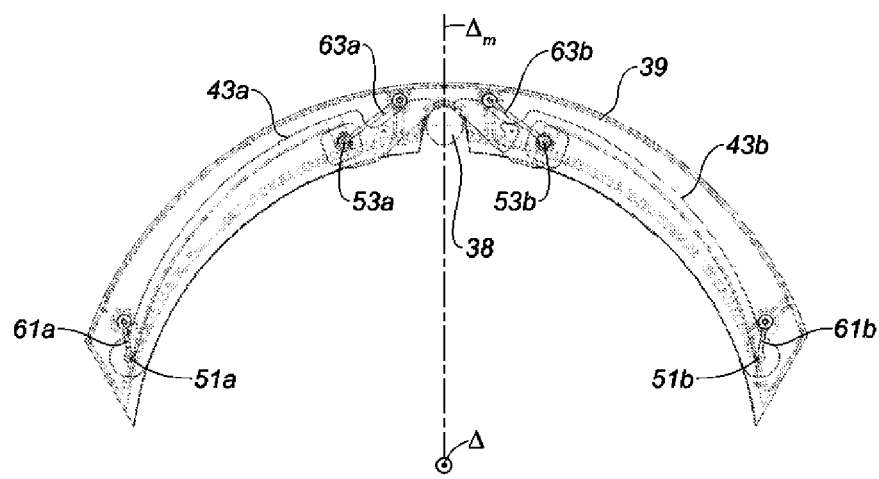
FIG. 5 is a schematic and partial front view of a door used in the form of FIG. 4 with deflection means in the retracted position.
Figure 6:
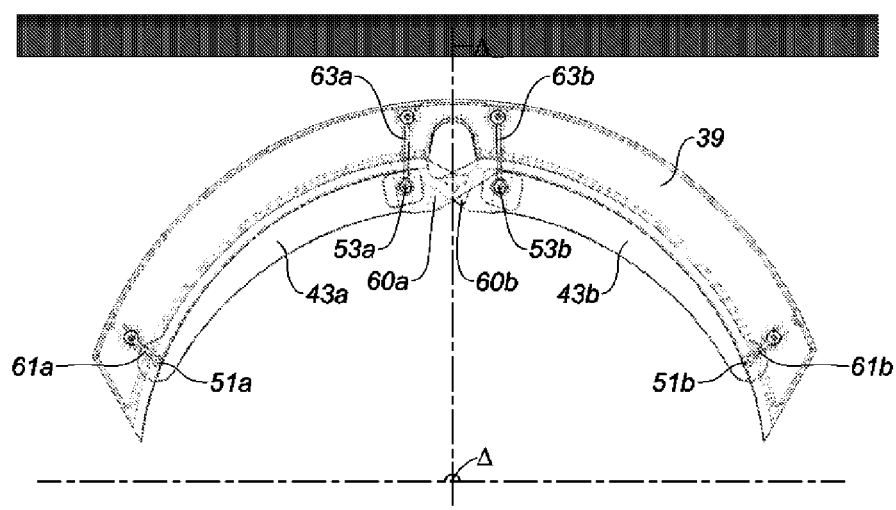
FIG. 6 is a schematic and partial front view of a door used in the form of FIG. 4 with deflection means in the deployed position.

As illustrated in FIGS. 4 to 6, each deflection means 43a, 43b is associated at its ends 51a, 51b, 53a and 53b with an articulation arm 61a, 61b, 63a and 63b rotationally mobile about a pivot axis substantially perpendicular to the deflection plane allowing rectilinear displacement of said deflection means 43a, 43b in the deflection plane upon switching from the retracted position to the deployed position.

Thus, by action of the articulation arm 61a, 61b, 63a and 63b, the deflection means 43a, 43b are set into motion according to a substantially rectilinear displacement in the deflection plane. The door of the present disclosure 39 thus has a deflection system which is simple to install, not cumbersome and reliable to use.

Further, the rectilinear displacement of the deflection means 43a, 43b allows the totality of the surface area of the deflection means 43a, 43b to be able to be in contact with the deflected air flow. Therefore, by the door of the present disclosure 39, the size of the deflection means 43a, 43b may be optimized depending on the desired size of the surface area in contact with the deflected air flow.

Advantageously, the adjustment of the kinematics of the deflection means 43a, 43b may be simply achieved by adjustment of the kinematics of the articulation arms 61a, 61b, 63a and 63b.

It is also possible to absorb the load of the aerodynamic forces of the deflection means 43a, 43b with the articulation arms 61a, 61b, 63a and 63b without resorting to additional devices of the slider or friction shoe type.

Finally, it is possible to contemplate synchronization of the whole of the deflection means 43a, 43b when said means attain the deployed position.

As illustrated in FIG. 6, the deflection means 43a and 43b may each comprise an abutment means 60a and 60b positioned at one end 53a and 53b of each deflection means so as to block the position of the deflection means 43a, 43b in a deployed position which gives the possibility of limiting the deployment of the deflection means 43a, 43b and avoiding damage to the neighboring ends of two deflection means 43a, 43b. The abutment means 60a and 60b may have a substantially V-shape which advantageously makes it possible to synchronize the deflection means 43a, 43b and guarantee symmetry of the trajectory of said means 43a, 43b.

The articulation arms 61a, 61b, 63a and 63b are attached both onto the door 39 and to each end of a deflection means 43a, 43b. The arms 61a, 61b, 63a and 63b may have a length adapted according to the desired travel followed by each deflection means 43a and 43b. In the case of the form of FIG. 2, the articulation arms 61a and 63a have a length which increases with the width of the deflection means 43a and 43b, in other words with the increase of the surface area in contact with the air flow. Thus, each fixed articulation arm 61b and 63b in proximity to the median axis Δm of the door 39 has a greater length than the articulation arms 61a and 63a attached at a distance from said median axis Δm.

It is thus possible to increase and decrease the surface area in contact with the air flow by modifying the length of each articulation arm 61a, 61b, 63a and 63b.

The articulation arms 61a, 61b, 63a and 63b may include at each end at least one elastic return means, notably in the form of a coil spring, with which it is possible to pass from the retracted position to the deployed position which gives the possibility of ensuring in a simple and efficient way the return to the deployed position when the nacelle 1 of the present disclosure receiving the door 39 is in the thrust reversal position. An articulation arm 61a, 61b, 63a and 63b may thus include at each end, a plurality of coil springs which allows operation of the articulation arms 61a, 61b, 63a and 63b even when a spring malfunctions or no longer operates.

The door actuator 38 allowing the door to pass from the open position to the closed position, may be positioned so as to receive and block one of the ends 61b and 63b of two deflection means 43a, 43b in a retracted position, which allows saving of space and mass while allowing efficient retention of said deflection means 43a and 43b. The ends may be adjacent and in proximity to the median axis Δm.

In an alternative, the OFS 9, notably the upstream frame 32, may comprise abutment means so as to receive and block one of the ends of the two deflection means 43a, 43b in the retracted position, notably adjacent ends.

Although the present disclosure has been described in connection with particular exemplary forms, it is quite obvious that it is by no means limited thereto and that it comprises all the technical equivalents of the means described as well as their combinations if the latter enter the scope of the present disclosure.

What is claimed is:

1. A door for a thrust reverser of a nacelle of an aircraft capable of being pivotally mounted on a fixed structure of the nacelle comprising:
an internal surface integrated to an annular circulation vein of an air flow; and
an external surface for providing external aero dynamic continuity of the nacelle equipped with said thrust reverser,
wherein said door being equipped with deflection means of the air flow, positioned at an upstream end of the door and moveably mounted in a deflection plane substantially perpendicular to a plane of the door between a first retracted position in which the deflection means do not penetrate the annular circulation vein when the door is in a closed position, and a second deployed position in which the deflection means will protrude from the door when the door is in an open position, each deflection means being associated at ends thereof with an articulation arm rotationally mobile about a pivot axis substantially perpendicular to the deflection plane allowing a rectilinear displacement of said deflection means in the deflection plane upon passing from the first retracted position to the second deployed position, and said door comprising a door actuator allowing the door to pass from the open position to the closed position, said door actuator being positioned so as to receive and to block adjacent ends of two deflection means in the first retracted position.

2. The door according to claim 1, wherein the deflection means comprise at least two spoilers or two flaps mounted on either side of a median axis of the door.

3. A thrust reverser system comprising at least one door according to claim 1 and a fixed structure on which said door is pivotally mounted between a closing position in which said door closes the thrust reverser and forms a portion of an outer cowling, the deflection means of the air flow being in the first retracted position, and an open position in which said door clears a passage in the fixed structure so as to deflect said one air flow, the deflection means being in the second deployed position.

4. The nacelle for a turbojet engine comprising at least one thrust reverser system according to claim 3.

* * * * *